March 31, 1959     M. ROSENBERG     2,880,288
SPEEDOMETER SWITCH
Filed May 9, 1955
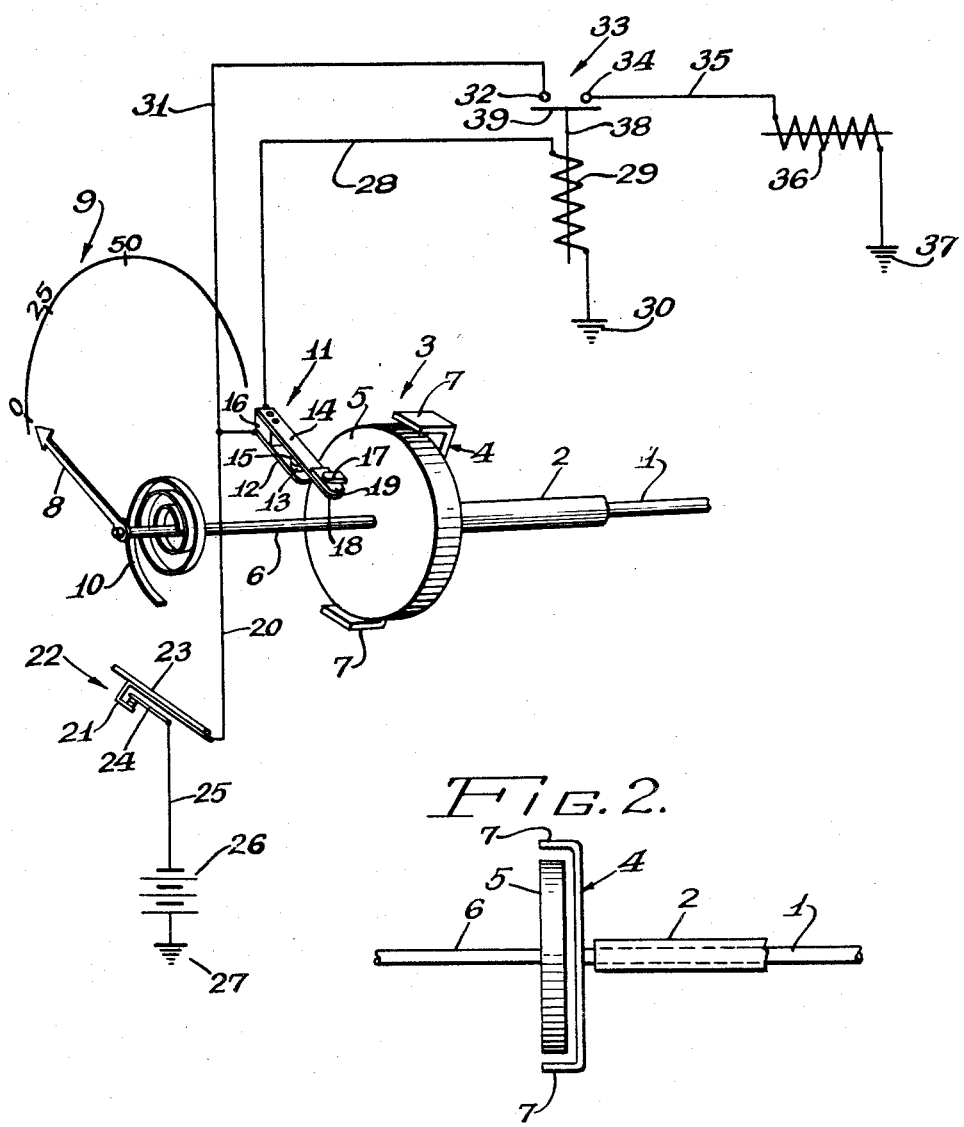
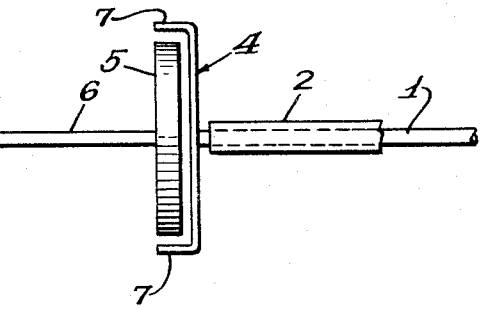
Inventor:
Max Rosenberg
By Gary, Desmond & Parker
Attys.

United States Patent Office 2,880,288
Patented Mar. 31, 1959

2,880,288

SPEEDOMETER SWITCH

Max Rosenberg, Chicago, Ill., assignor to Gaylord Products Incorporated, Chicago, Ill., a corporation of Delaware Application May 9, 1955, Serial No. 506,725

1 Claim. (Cl. 200—92)

This invention relates to improvements in a speed-responsive electric switch for automotive vehicles, and refers particularly to a speed-responsive electric switch which is associated with the conventional speedometer of an automobile.

In automotive vehicles it is desirable to effect predetermined controls in response to the speed or in response to the stopping of the vehicle. For instance, in controlling the operation of a so-called anti-creep device, such device is controlled in response to the movement of the vehicle. An anti-creep device is employed on automotive vehicles, usually those having automatic transmissions and hydraulic torque converters, to prevent undesirable movement at idling speeds of the engine and while the transmission is in gear. The conventional anti-creep device comprises essentially three elements; a solenoid-operated check valve interposed in the hydraulic brake line; an electric switch controlled by the accelerator pedal or accelerator linkage which is closed when the accelerator pedal is undepressed and is opened when the accelerator pedal is depressed; and an electric switch which is responsive to movement of the vehicle, said switch being open when the vehicle moves at normal speeds, but which closes when the vehicle stops or moves at a very low speed. The switches are connected in series with the solenoid of the solenoid-operated valve and function to close said valve when the vehicle stops or moves at very slow speed, thereby confining fluid under pressure in the wheel cylinders of the hydraulic brake system whereby motion of the vehicle is prevented when it is intended that the vehicle remain stationary.

The present invention is directed to a speed-responsive switch which may be employed in such an anti-creep system and is so contrived as to be responsive to the operation of the indicating mechanism of a conventional speedometer.

Briefly described, the device comprising the present invention includes a stationary switch arm and a movable switch arm, the latter arm being carried by the magnetically moved element of the speedometer, that is, the element which actuates the speedometer pointer, the switch arms being separated when the vehicle moves at normal driving speeds, but being brought together when the vehicle stops or moves at relative low speeds.

The objects, advantages and features of the present invention will be more apparent from the accompanying drawing and following detailed description.

In the drawing,

Fig. 1 is a diagrammatic view of the device embodying the concepts of the present invention.

Fig. 2 is a diagrammatic side elevational view of a portion of the actuating members of a conventional speedometer.

Referring in detail to the drawing, 1 indicates a speedometer cable which may be connected at one end (not shown) to a wheel of a vehicle or the drive shaft thereof, whereby cable 1 rotates in timed relationship with the movement of the vehicle. The speedometer cable 1 is carried within a sheath 2 which functions to enclose the cable and also functions as a journal for the rotary movement of the cable.

The reference numeral 3 indicates diagrammatically a portion of the working parts of a conventional automotive speedometer. A bar magnet 4 is carried intermediate its length upon the end of the speedometer cable 1 the arrangement being such that when the cable rotates the bar rotates in timed relationship therewith. The operating mechanism 3 also comprises a metal disc or rotor 5 which is secured to pointer shaft 6, the rotor 5 being disposed adjacent and in plane-parallel relationship to the bar magnet 4. At the opposite ends of the bar magnet 4, said bar carries outwardly projecting lugs 7 which are adapted to overhang the periphery of the disc 5 and are disposed in radial spaced relationship with respect to said periphery.

At the end of the shaft 6 a pointer 8 is carried which is adapted to move circularly over a calibrated dial 9, the dial usually being calibrated in miles per hour. A coil spring 10 is connected to shaft 6 and functions to return to pointer 8 to its zero position.

The construction of the device 3 is conventional and per se constitutes no part of the present invention. However, positioned adjacent the movable disc 5 is an electric switch 11, said switch comprising a stationary arm 12 having a contact element 13 and a resilient movable arm 14 carrying a contact element 15. The arms 12 and 14 are separated by a block of insulating material 16. A lug 17 is mounted upon the face of the disc 5 and an end portion 18 of the movable resilient arm 14 is positioned in the path of travel of the lug 17 when the disc 5 is rotated. The end portion 18 of the movable arm 14 carries an insulating pad 19 which is adapted, under predetermined conditions, to be contacted by the lug 17.

The switch 11 is so positioned with respect to the rotatable disc 5 and the lug 17 is so positioned upon said disc that when said lug contacts the movable arm 14 to bring the contact elements 13 and 15 into closed position, the pointer 8 will indicate zero or substantially zero upon the calibrated dial 9. The switch 11 is of the normally-open type and is closed only when the movable arm is contacted by the lug 17.

The stationary arm 12 of the switch 11 is connected by means of a conductor 20 to arm 21 of accelerator switch 22, arm 21 being carried upon the lower surface of accelerator pedal 23. Accelerator switch 22 also comprises a cooperating arm 24 which is connected by means of conductor 25 to battery 26. The opposite side of battery 26 is connected to ground 27. The switch 22 is of such construction that when the accelerator pedal 23 is undepressed the switch is closed and when the accelerator pedal is depressed, the switch is opened.

The movable arm 14 of switch 11 is connected by means of conductor 28 to one end of relay coil 29, the opposite end of which is connected to ground 30. The stationary arm 12 of switch 11 is connected by means of conductor 31 to contact point 32 of relay switch 33. The opposite contact point 34 of the relay switch 33 is connected by means of conductor 35 to one end of solenoid 36, the opposite end of which is connected to ground 37.

The arrangement hereinbefore described is ideally adapted for the control of an anti-creep device wherein fluid under pressure is confined in the wheel cylinders of the hydraulic brake system when a solenoid-operated valve is energized. In Fig. 1 of the drawing the coil 36 is adapted to schematically indicate the solenoid associated with a conventional solenoid-operated valve. Of course, it is to be understood that the invention might be used in other environments, that is, for effecting other controls upon an automobile, and hence, it is not intended that the invention be limited specifically to its use in conjunction with an anti-creep device.

When the vehicle upon which the present invention is employed is stationary, switch 11 is closed and switch 22 is also closed. An electrical circuit is then completed through relay coil 29 and plunger 38 associated with the coil 29 is so moved as to cause arm 39 to bridge the contact points 32 and 34. Hence, solenoid 36 will be energized. If, in bringing the automobile to a stop, the brakes are employed, fluid under pressure will be confined in the wheel cylinders of the brake system, and hence, when solenoid 36 is energized the valve associated with said solenoid will be closed and the fluid under pressure will be confined in the wheel cylinders and the brakes will be applied. When the vehicle is set in motion the operator, in order to start the vehicle in motion, depresses the accelerator pedal 23 and hence opens switch 22. The opening of switch 22 de-energizes relay coil 29, and hence, solenoid 36 is de-energized by the opening of relay switch 33. Accordingly, when the accelerator pedal 23 is depressed fluid under pressure is relieved from the wheel cylinders and the automobile is in condition to be driven.

Of course, when the automobile is in motion, speedometer cable 1 is rotated. The rotating of the speedometer cable causes magnet 4 to rotate, and hence, a torque is exerted upon disc 5 which causes said disc to rotate against the tension of coil spring 10. When disc 5 rotates, lug 17 relieves its pressure upon the movable arm 14, and hence, switch 11 is also opened.

If, with the automobile in motion, the operator desires to slow up the vehicle but not to come to a complete stop, his foot will be removed from the accelerator pedal 23, and hence, switch 22 will close. Of course, in retarding the vehicle, the operator applies pressure to the fluid in the brake system, and hence, fluid under pressure exists in the wheel cylinders of the brake system while the operator's foot depresses the brake pedal. However, in view of the fact that the automobile remains in motion, the speedometer cable 1 continues to rotate, and hence, lug 17 remains spaced from the movable arm 14 of switch 11. Hence, when the operator removes his foot from the brake pedal the fluid under pressure in the wheel cylinders will not be confined therein since switch 11 remains open and relay switch 33 remains open.

Accordingly, while the automobile remains in motion solenoid 36 remains de-energized. However, when the automobile stops, with the fluid under pressure in the wheel cylinders, solenoid 36 will be energized, and hence, said fluid under pressure will be confined in the wheel cylinders.

Of course, switch 11 may be so positioned that it will be closed before the automobile comes to a complete stop or may be so positioned as to be closed when the automobile moves at any predetermined speed. Hence, if the device comprising the present invention is to be used for a control other than an anti-creep device it may actuate said control at any desired rate of movement of the vehicle.

It will be apparent to anyone skilled in the art that the present invention may be modified without departing from the spirit thereof, and hence, it is not intended that the invention be limited to the precise details shown and described except as necessitated by the appended claim.

I claim as my invention:

A speedometer operated switch which comprises, a speedometer cable, a magnet mounted upon said cable and rotatable therewith, a speedometer indicator shaft disposed in spaced coaxial relationship with an end portion of the speedometer cable, said magnet comprising a diametrically disposed bar, a circular metal disc carried by said indicator shaft and disposed adjacent said magnet, end portions carried by said magnet at substantially right-angles to said bar, said end portions being disposed in radial spaced relationship to the periphery of said disc whereby a torque is exerted by said magnet upon said metal disc in proportion to the rate of rotation of said magnet, resilient means biasing said indicator shaft for rotation in opposition to the rotation of said magnet, an electric switch having a substantially stationary contact-carrying arm and a movable contact-carrying arm, the contacts being disposed in juxtaposed position with respect to each other, a lug carried by said driven metallic disc and extending outwardly from a face thereof, and an extension upon the movable arm of said switch disposed as a stop in the path of travel of said lug when said disc rotates under the influence of said resilient means whereby said lug contacts said extension under the resilient pressure of said resilient means and holds said switch in actuated position.

References Cited in the file of this patent
UNITED STATES PATENTS

| | | |
|---|---|---|
| 2,125,055 | Taliaferro | July 26, 1938 |
| 2,194,311 | Leonard | Mar. 19, 1940 |
| 2,198,902 | Caldwell | Apr. 30, 1940 |
| 2,206,696 | Hall | July 2, 1940 |
| 2,372,131 | Smith | Mar. 20, 1945 |
| 2,594,155 | Guernsey | Apr. 22, 1952 |
| 2,610,239 | Shepherd | Sept. 9, 1952 |
| 2,642,484 | Price | June 16, 1953 |
| 2,701,035 | Leichsenring | Feb. 1, 1955 |